United States Patent Office 3,085,635
Patented Apr. 16, 1963

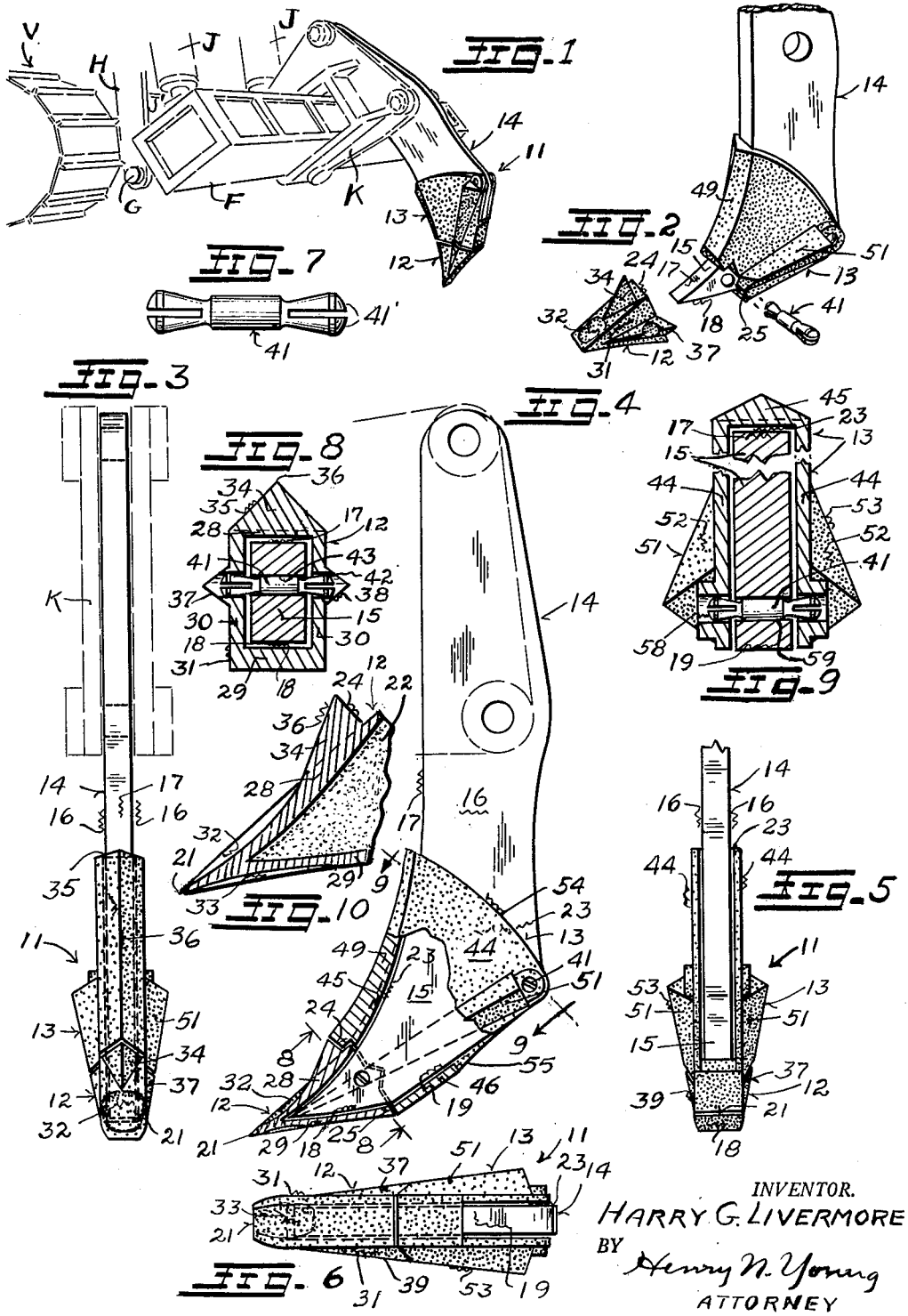

3,085,635
GROUND-ROOTING TOOTH AND ITS MOUNTING
Harry G. Livermore, 740 Roosevelt Ave., Tracy, Calif.
Filed Aug. 7, 1959, Ser. No. 832,258
2 Claims. (Cl. 172—699)

The invention relates to a heavy-duty ground-rooting or ripping tooth for operative application by a propelling vehicle.

In the ground-moving art, it is customary to loosen unbroken or packed ground for facilitating its subsequent handling by shovel or plow or scraper, etc., by forcefully moving along and upon the ground a suitable vehicle carrying one or more rooting teeth in ground-penetrating and breaking relation thereto, it being understood that ground-rooting teeth so applied are subject to considerable wear at their working point portions while in use. Accordingly, it is a general object of the invention to provide a ground-rooting tooth having a structure which is particularly efficient and durable in use.

Another object is to provide a ground-rooting tooth of the character described which is so mountable on a carrying vehicle that it tends to maintain its working point at a desired fixed distance below the top level of the supporting ground in which it is operated.

A further object is to provide a ground-rooting tooth of the character described which is operative with particular efficiency to provide the widest possible ripped or grooved ground area during its operative application.

An added object is to provide an improved ground-rooting tooth which is arranged for its replaceable mounting on a supporting shank provided by the propelling vehicle in adjusted relation thereto.

Yet another object is to provide a rooting tooth of the character described having cooperative working-point and shank-guard elements replaceably mounted on a common vehicle-propelled carrying shank to provide for the more-frequently required replacement of the point portion.

The invention possesses other objects and features of advantage, some of which, with the foregoing, will be set forth or be apparent in the following description of a typical embodiment thereof, and in the accompanying drawings, in which, FIGURE 1 illustrates a rooting tooth embodying the features of present invention as applied to a mounting shank adjustably carried by a fragmentarily-indicated vehicle.

FIGURE 2 is an exploded perspective view showing elements of the present rooting tooth mutually spaced with reference to a shank mounting one of them, with the shank disposing the tooth in a working position therefor.

FIGURE 3 is an enlarged upright front edge view of the tooth assembly as mounted on the carrying shank.

FIGURE 4 is a side and partly sectional elevation of the assembly of FIGURE 3.

FIGURE 5 is a rear elevation of the assembly of FIGURE 3.

FIGURE 6 is an underneath view of the assembly of FIGURE 3.

FIGURE 7 is an elevation of spring pins which are utilized in releasably securing the tooth to the shank.

FIGURE 8 is an enlarged section taken at the line 8—8 in FIGURE 4.

FIGURE 9 is an enlarged sectional view taken at the line 9—9 in FIGURE 4.

FIGURE 10 is an enlarged fragmentary section of the point element of the tooth.

As disclosed in FIGURE 1, a rooting tooth 11 embodying my invention, and having point and guard portions 12 and 13 respectively, is shown as mounted on a shank 14 carried by a rectangular support frame F of a general box-beam structure of uniform exterior cross-section longitudinally therealong. The frame F is swingably adjustable about an axis longitudinal thereof and defined by coaxial frame-mounting trunnions G provided by the frame and journalled in hanger bars H provided at the rear of such vehicles as the fragmentarily-shown vehicle V of the track-laying tractor type which also mounts hydraulic jacks J having their piston rods J' hingedly connected to the frame F for swingably adjusting the frame and a rooting tooth carried by a shank 14 mounted on the frame. The upper end portion of a present tooth-mounting shank 14 is particularly shown as fixedly carried by and between a pair of mutually opposed bracket members K which are mounted on the frame F in bolted-on relation thereto, it being understood that a frame F may carry a plurality of tooth-mounting shanks 14 in transversely spaced relation along the frame, although only one shank is presently shown as provided on the mounting frame F.

By particular reference to FIGURES 1 and 2, it will be noted that the rooting tooth 11 of my invention is arranged for its mounting on the shank member 14 which is replaceably carried on the carrying vehicle V, whereby the vehicle-and-tooth combination essentially comprises a ground-rooting implement. The shank member 14 has at its bottom an upright planar tooth-mounting portion 15 which is of general wedge form in its plane and is arranged to have its point directed forwardly and obliquely downwardly in a line of working application for a tooth 11 carried by it. At least the generally triangular and forwardly-directed tooth-mounting portion 15 of the shank 14 is of uniform thickness having mutually parallel opposite faces 16 connected by a transverse forward edge 17 which is concavedly curved longitudinally thereof from the shank point, and an under edge having angularly related forward and rearward conterminous face portions 18 and 19 perpendicular to the plane of the shank and defining an outside (reflex) angle slightly exceeding 180°. For reasons which will hereinafter appear, the point and guard portions 12 and 13 of the tooth 11 may advantageously comprise separately formed one-piece and cooperative elements of a tooth assembly, and are replaceably mountable on the shank portion 15 in unitary association for their joint functioning as a one-piece structure.

It will now be noted that the point element 12 of a tooth assembly 11 is relatively narrow adjacent its working edge 21 and is provided with a tapered socket 22 which is shaped to complementarily and closely receive the point portion 15 of the shank 14, and that the tubular guard element 13 of the tooth assembly 11 has a longitudinal bore 23 which is arranged to complementarily receive the part of the shank portion 15 which is immediately behind the part carrying the mounted point element 12 of the tooth. The relation of the shank-carried tooth elements 12 and 13 is such that they are arranged to mutually abut at their respective continuous opposed rearward and forward end faces 24 and 25 which are transversely stepped or jogged in such a complementary manner, as that illustrated in FIGURES 2 and 4, that solely a predetermined fixed alignment of the cooperatively engaged tooth elements is assured, it being noted that said opposed end faces 24 and 25 extend generally obliquely upwardly and forwardly from the line defined at the juncture of the bottom edge portions 18 and 19 of the mounting shank portion 14.

By particular reference to the configuration of the point element 12 of the tooth 11, it will now be noted that the upper and lower outer faces of this element are provided by diverging walls 28 and 29 and are conterminous at the working edge 21, said walls providing between them corresponding sides of the socket 22 and having their outer faces defining an included angle of approximately thirty degrees adjacent the working edge 21, and the walls 28 and 29 are integrally connected by walls 30 providing the socket sides and having minor forward portions of their outer faces diverging slightly to rearward mutually parallel face portions 31. Preferably, and as shown, the element wall 28 is provided with a concavity 32 extending rearwardly from the tooth edge 21 for substantially half the length of its upper face, while the wall 29 providing the lower element face is provided with an external concavity 33 corresponding to and opposite the concavity 32 of the upper wall 28 and also extending from the edge 21, said concavities being of generally spherical segment form and the arrangement being such that the forward portion of the element 12 is thickest adjacent the face portions 31 and laterally of the concavities 32 and 33. Having the unitary point element 12 so formed of a suitable wear-resistant material, it will be understood that the wear on the applied working tooth edge 21 will take place at a faster rate at the intermediate edge portion between the thicker side portions of the element 12, whereby the operativeness of the working edge 21 for the full tooth width may be automatically maintained as the ground-engaging tooth surfaces are worn away by use.

It will now be noted that the upper wall 28 of the element 12 has a deflector projection 34 of triangular pyramid outline extending transversely outwardly therefrom and centrally therealong from an apex at the rearward end of the concavity 32 to the rear end face 24 of the element. More specifically, the projection 34 is of isosceles triangle cross-section and has like triangular side faces 35 extending to a common edge 36 directed angularly from the rearward end of the concavity 32 in a plane which perpendicularly bisects the line of the working edge 21, and comprises the plane of symmetry for the tooth assembly. Forward portions 37 of guide fins of triangular pyramid outline extend along and transversely from the face portions 31 of the outer side faces of the element 12 from apices opposite intermediate points of the concavity 33 to the element rear end face 24, and said portions 37 are of isosceles triangle cross-section therealong having like triangular side faces 38 extending from the parallel rear portions of the different element face portions 31 to common edges 39 angularly related to the faces 38 in a common plane which generally bisects the angle defined between the planes of the upper and lower faces of the element 12 defining the working edge 21. The deflector and fin portions 34 and 37 respectively may be integral with the tooth element 12, as is indicated.

A means is provided for releasably fixing the point element 12 of the tooth 11 on and to the tapered forward end of the tooth-mounting shank portion 15 when the latter is fully engaged within the complementary receiving socket 22 of the element and said means is shown as comprising a pin 41 removably engaged in registering bores 42 and 43 extending transversely through the sides of the element 12 and the shank-mounting portion 15, respectively; a present pin 41 is provided with resiliently expandable split end portions 41' for retention in the bores 42 by reason of the spreading of its end portions 41' in said bores for frictionally maintaining a mounted pin 41 in longitudinally centered position with respect to the mounting sides of the point portion 12, it being understood that a pin 41 of the present type may be driven longitudinally into and from its operative position. As particularly shown, the pin-receiving bores 42 extend through the guide fin portions 37 at corresponding rear end points thereof, with the common axis of said bores lying in the common plane of the fin edges 39 thereat.

The interior surface of the guard element 13 bounding its shank-receiving bore 23 is arranged to closely and complementarily receive and enclose the rearward part of the shank portion 15 when the rearward end edge 24 of the mounted element 12 abuts the forward end edge 25 of the element 13 in a desirable laterally interlocked relation of the elements, whereby the tooth assembly then jointly provided by the shank-connected elements 12 and 13 may function as if it were a one-piece unit. As shown, the tubular guard element 13 has its shank-receiving bore 23 defined between mutually parallel socket-defining side walls 44 which are spaced at their inner and outer faces as the mutually parallel rearward portions of the side walls 30 of the tooth element 12, and are connected by upper and lower cross-walls 45 and 46 respectively having their inner faces complementary to and disposable opposite and along the enclosed portion of the curved forward shank edges 17 and the bottom shank edge portion 19 when the element 13 is fully mounted on the shank portion 15 behind the element 12 mounted thereon.

It will now be noted that the longitudinally curved forward cross-wall 45 of the guard element 13 provides a conterminous continuation 49 of the deflector portion 34 provided on the top wall 28 of the element 12, with said deflector continuation of triangular prism form therealong and having its base width no greater than the width of the upper cross-wall 45 and extending from the forward edge face 25 of the element 12 to the rear end of said wall. Also, the side walls 44 are exteriorly provided with conterminous extensions 51 of the fin portions 37 of the element 12, with said extensions continuing the triangular pyramid of the portions 37 and having their side faces 52 intersecting at outer edges 53 which diverge rearwardly with respect to the corresponding walls 44 and are aligned with and lie in the continued common plane of the edges 39 of the forward guide fin portions 37 provided by the element 12. It will be understood that the respective deflector and fin portions 49 and 51 may be, and are preferably, integral with the guard element 13, as are the leading deflector and fin portions 34 and 37 integral with the tooth element 12 which provides them. Also, the rear ends of the walls 44 and 45 of the element 13 are shown as conterminous at a common rear end edge portion 54 of the element, while the lower cross-wall 46 terminates at a rear element end edge portion 55 which is somewhat forwardly of the element extremity defined by the edge 54.

As particularly shown, a pin 41 is installed and utilized adjacent the lower rear corners of the side walls 44 and rearwardly of the rear end edge 55 of the cross-wall 46 to secure the guard element 13 to the shank 14 for mounting the rear end of the element 13 on the shank. The pin 41 is installed through aligned openings 58 provided through the walls 44 at portions of the fins 51 adjacent the rear edges of said walls and in a transverse opening 59 provided through the shank portion 15 and aligned with the openings 58 while the shank portion 15 is socketed within the element 13. Preferably, and as shown, the fin portions 51 are cut back toward the wall 46 at the openings 58 and from their ends at the rear element edge 55 whereby the retained fin portions forwardly thereof may function as a deflecting guard for the exposed pin ends beyond them.

It will now be noted that the present unitary two-part tooth 11 is provided in its use position on a shank 14 by first telescopically mounting and fitting the guard element 13 on the rear part of the shank portion 15, and securing the mounted element 13 to the shank by operatively applying a pin 41 to the element and shank through the respective aligned openings 58 and 59 of the elements. The point element 12 is now applied in socketing relation to the forward part of the shank portion 15, and is fixed to the shank by the application of a pin 41 in the aligned pin-receiving bores 42 and 43 of the element 12 and shank portion 15 respectively, while the tooth elements 12 and 13 are fittedly interlocked in mutual alignment; as particularly shown, the forward end of the deflector continuation 49 of the element 13 fittedly overlaps the upper face of the element 12, while the rear end of the forward fin portion 37 of the point element 12 provides a V-edge projection engaging in a complementary notch provided in the opposed forward end of the rear fin portion 51.

Experience has taught that a guard element 13 may be made of a material (as ordinary cast steel) to which a renewable wear surface material may be welded to provide a wear face which is appreciably softer against abrasive wear than the necessarily relatively hard-faced, and much more expensive material (as surface-tempered carbon steel) of the point element 12, yet will still outlast a succession of elements 12 used with the same shank 14 and guard element 13, to thereby provide an appreciable saving in the cost of maintaining the operativeness of a present two-piece shank-mounted rooting tooth 11 (12—13), particularly since a present tooth point element 12 comprises a replaceable minor part (in terms of both weight and wear surface) of the unitary tooth assembly 11 (12—13). It is also to be noted that the fins 37—51 of an appropriately applied tooth are arranged to lead the forward working point of the present tooth assembly 11 into the ground and thereafter guide it at a set depth by reason of the flow of loosened material over the fins while the shank is moved in fixed angular relation to the ground. Further, the spread of the fins laterally of the leading tooth portion provides for the breaking-up of a relatively wide area of the engaged ground, it being understood that a wider area of fracture occurs in harder ground, and that teeth 11 having different fin spreads laterally thereof may be provided and utilized in accordance with the physical qualities of the ground to be worked.

From the foregoing description taken in connection with the accompanying drawings, the advantages of the present ground-rooting tooth and its mounting will be readily understood by those skilled in the art to which the invention appertains. While I have shown and described a structure and operative arrangement which I now consider to comprise a preferred embodiment of my invention, I desire to have it understood that the showings are primarily illustrative, and that such changes and developments may be made, when desired, as fall within the scope of the following claims.

I claim:

1. In a travelling ground-working implement carrying a generally upright tooth-mounting shank having a lower part tapering forwardly and downwardly to a terminal lower end thereof, a rooting tooth providing a rearwardly-opening socket complementarily receiving said tapered shank part and having upper and lower external faces diverging from the working edge of the tooth at its forward end and connected by sides having outer faces of like outline in a tooth structure which is symmetrical transversely thereof with reference to a plane which perpendicularly bisects said working edge of the tooth, a deflector projection of triangular cross-section extending upwardly from the upper tooth face and rearwardly therealong from an intermediate point of said upper face and having its free edge line disposed in said plane of symmetry of the tooth, and ground-splitting fins of triangular pyramid conformation projecting outwardly from said side tooth faces intermediately of the edges thereof and rearwardly therealong from corresponding intermediate apex points in said side faces and having the mutually diverging outer edges thereof disposed in a common plane perpendicular to said plane of symmetry of the tooth, and a means releasably fixing said rooting tooth upon the received tooth-mounting point of the shank.

2. In a traveling ground-working implement carrying a generally upright tooth-carrying shank depending to a terminal lower end part thereof, a rooting tooth provided at said lower shank part and having upper and lower external faces diverging from the working edge of the tooth at its forward end and connected by sides having outer faces of like outline in a tooth structure which is symmetrical transversely thereof with reference to a plane which perpendicularly bisects said working edge of the tooth, a deflector projection of triangular cross-section extending upwardly from the upper tooth face and rearwardly therealong from an intermediate point of said upper face and having its free edge line disposed in said plane of symmetry of the tooth, and ground-splitting fins of triangular pyramid conformation projecting outwardly from said side tooth faces intermediately of the edges thereof and rearwardly therealong from corresponding intermediate apex points in said side faces and having the mutually diverging outer edges thereof disposed in a common plane perpendicular to said plane of symmetry of the tooth.

References Cited in the file of this patent

UNITED STATES PATENTS

| 774,324 | Hill et al. | Nov. 8, 1904 |
| 1,395,048 | McKee | Oct. 25, 1921 |
| 1,890,981 | Finkl | Dec. 13, 1932 |
| 2,050,014 | Morrison | Aug. 4, 1936 |
| 2,521,045 | Corbell | Sept. 5, 1950 |
| 2,716,822 | Launder et al. | Sept. 6, 1955 |
| 2,860,861 | Larson | Nov. 18, 1958 |

FOREIGN PATENTS

| 213,291 | Australia | Feb. 25, 1958 |
| 421,899 | Great Britain | Jan. 2, 1935 |